United States Patent
Pause

[11] Patent Number: 6,132,082
[45] Date of Patent: Oct. 17, 2000

[54] DEVICE FOR THE MEASUREMENT OF HEAT TRANSFER CHARACTERISTICS OF MULTILAYER SAMPLE ARRANGEMENTS

[76] Inventor: Barbara Hildegard Pause, 8076 Dry Creek Cir., Longmont, Colo. 80503

[21] Appl. No.: 08/986,656

[22] Filed: Dec. 8, 1997

[30] Foreign Application Priority Data

Dec. 13, 1996 [DE] Germany ................ 296 21 637 U

[51] Int. Cl.$^7$ ................... G01N 25/20; G01N 25/18
[52] U.S. Cl. ........................................ 374/43; 374/44
[58] Field of Search .................... 374/29, 30, 43, 374/44

[56] References Cited

U.S. PATENT DOCUMENTS

| | | |
|---|---|---|
| 4,095,454 | 6/1978 | Fisher ............................................. 374/43 |
| 4,630,938 | 12/1986 | Piorkowska-Palczewska et al. . 374/43 |
| 5,005,985 | 4/1991 | Piorkowska-Galeska et al. ....... 374/43 |
| 5,174,654 | 12/1992 | Droege ........................................ 374/43 |
| 5,667,301 | 9/1997 | Jurkowski et al. ......................... 374/43 |

*Primary Examiner*—Christopher W. Fulton
*Assistant Examiner*—Quyen Doan

[57] ABSTRACT

The invention provides a device for measuring heat transfer through plate-like sample arrangements under various test conditions. The device consists of two chambers. For determining the heat transfer through the sample arrangement located between the two chambers the first chamber is set at a certain temperature or undergoes a temperature variation. Furthermore, the sample arrangement can be exposed to heat radiation provided by a surface heater in front of the sample arrangement as well as to convective heat realized by using an ventilation system. Temperature changes as a result of heat transfer through the test samples are measured within the second chamber using PT 100 temperature sensors. Furthermore, temperature measurements are taken at locations inside the sample arrangement. Infrared sensors are used to measure the irradiation intensity in front of the sample arrangement and the heat emission from the back side of the sample arrangement. Thermophysical characteristics such as thermal conductivity, thermal resistance, heat absorption, heat transition and heat emission of multilayered insulation products are determined under the various test conditions from the measured temperatures, heat fluxes as well as the thickness of the sample arrangement.

4 Claims, 2 Drawing Sheets

DEVICE FOR THE MEASUREMENT OF HEAT TRANSFER CHARACTERISTICS OF MULTILAYER SAMPLE ARRANGEMENTS

BACKGROUND OF THE INVENTION

Thermal insulation materials are used to minimize the heat exchange between an object and its environment. In this way undesired heat absorption from the environment as well as heat loss into the environment are avoided. A thermal insulation system is often comprised of several material layer with air layers in between. The thermal insulation effect achieved is given in terms of thermal resistance. The thermal resistance values of the materials themselves are calculated from their thermal conductivity and thickness values. Thermal conductivity values from the individual materials have often already been determined and published. Otherwise they can be determined using existing methods. The total thermal resistance of an insulation system can then be calculated as sum of the thermal resistance values of the individual materials making up the system. Because the thermal insulation system normally consists of more than a single layer of material, air layers are often exist between them. Air is generally known to insulate well, but it is difficult to calculate the thermal resistance of an air layer. The reason is that different heat transport mechanism can be activated in the materials themselves. Therefore, the contribution of air layers to the overall thermal resistance of the insulation configuration can basically only be estimated. Besides this, the heat transport through the complete insulation system, hence its overall thermal resistance, is also influenced by the type of heat exposure (radiative heat, convective heat or conductive heat) applied to the system. If other types of heat exposures come into play then that under which the calculations were made the calculated insulation effect could be inaccurate. In some instances changes will also need to be made to the construction of the insulation system already on the market. A solution of this problem would be the testing of complete insulation systems instead of their single components after their construction and before entrance into the market as opposed to testing individual components separately in order to determine all the necessary heat transfer characteristics of the system with various types of heat exposures and thermocycling processes applied. The test results would then indicate the true thermal performance of the finished insulation product which would help avoid design shortcomings prior to final production. Measuring methods allowing insulation products consisting of several material layers exposed to various types of heat exposure to be tested in a single apparatus are presently not available.

SUMMARY OF THE INVENTION

Subject of the invention is a device for measuring heat transfer through plate-like material layer systems used for insulation products. The heat transfer through the material samples is determined at exposure to various types of heat and various ambient temperatures. Testing under all of the above conditions can be carried out using the same device. Using the measuring device conditions corresponding to real practice conditions can be simulated. In the tests important heat transfer characteristics of technical insulation products, building walls as well as garment systems can be determined. The tests are carried out using relatively small pieces of each sample.

New insulation materials and construction systems as well as material samples of existing construction systems can be tested in the device at a relatively low cost. If the tests are carried out on new material configurations shortcomings in the construction systems can be recognized prior to any attempt at practical application. This approach allows thermal insulation products to be developed at lower cost than they otherwise would be by eliminating the need to make any post-production alterations to the materials or the system involved.

The device consists of two chambers. The first is set at various temperatures and types of heat exposure. Temperature changes as a result of heat transfer through the test samples are measured within the second chamber. Furthermore, temperature measurements are taken from the sample surfaces and in the air spaces between the sample layers. Thermophysical characteristics such as thermal conductivity, thermal resistance, heat absorption, heat transition and heat emission of the multilayered insulation product are determined from the measured temperatures, the heat fluxes and the thickness of the test arrangement.

DETAILED DESCRIPTION

The subject of the invention is a device for the determination the heat transfer through insulation products consisting of one or more layers of plate-like samples with air layers between under different heat exposures as well as thermocycles. The purpose of the invention is achieved by the features stated in claim 1. The Subclaims represent appropriate designs of the measuring device. The device Is described by means of the following design example.

Figure 1:
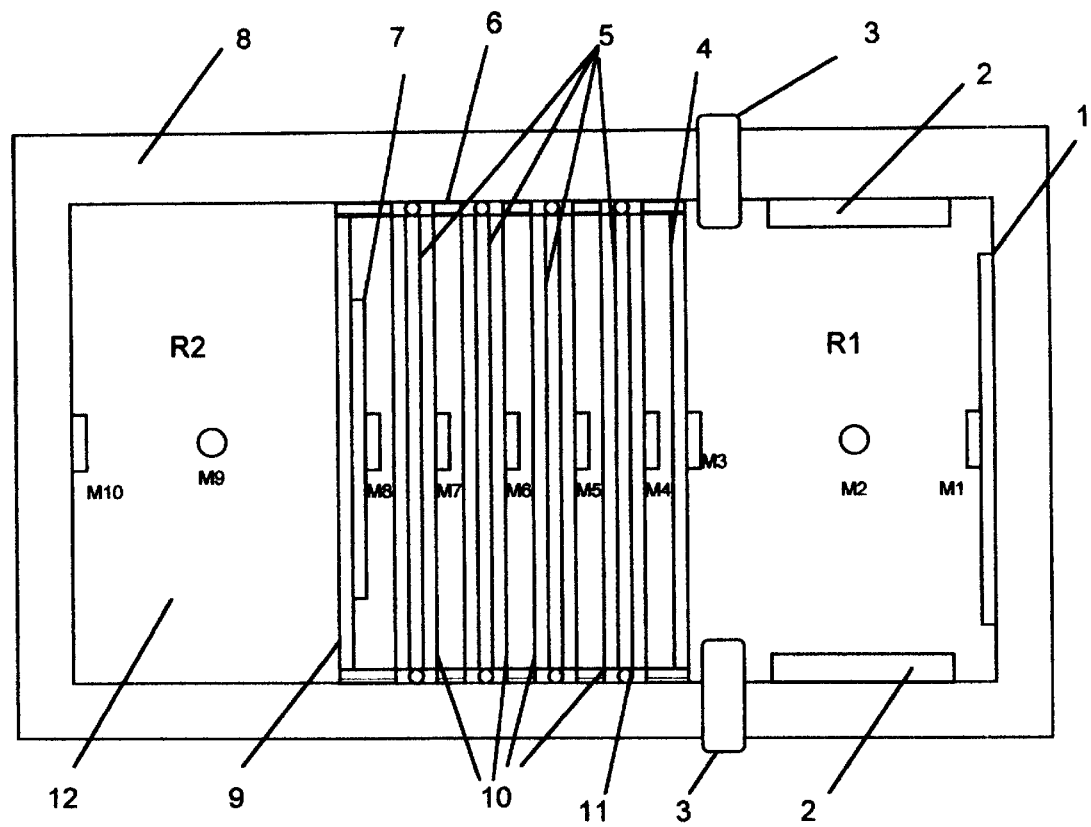
FIG. 1 is a sectional plan view of the measuring unit.

The measuring unit according to the invention consists of two chambers (R1 and R2) separated by one or more layers of the test samples. In addition to the design shown in FIG. 1 another arrangement of the chambers is possible, whereby chamber R2 and the test samples are totally encapsulated by chamber R1.

R1 is equipped with two computer-controlled Peltier elements (2) which heat or cool the air within the chamber. The control mechanism is preset to a specific duration and temperature. Measurements are carried out either at a defined temperature, during a heating or cooling process, or during the course of a thermocycle. The air temperature in chamber R1 is continuously measured by means of a PT 100 temperature sensor located at M2.

In order to expose the surface of the test sample to heat radiation, a surface heater (1) affixed to the sidewall of R1 opposite the sample arrangement is activated. This heater is normally set to emit heat at a constant rate and is operated independently of the Peltier elements. The surface temperature of the heater is continuously measured with a PT 100 temperature sensor located at M1. This temperature measurement is used to control the amount of electrical current applied to the heater by using an external power supply in order to realize a constant heat emission from the surface heater.

The amount of heat radiation exposed to the top layer of the sample arrangement is measured by an infrared sensor located in front of a diaphragm (4) at M3. The diaphragm creates a thermal barrier between the samples and chamber R1, thereby avoiding any heat fluxes through the samples prior to the measurement initialization. In order to create an effective thermal separation, the diaphragm must be made of a material with a low heat absorption capacity. Aluminum sheets are well-suited for this purpose. The diaphragm can be removed from the measuring unit through an opening (13) in the cover of the measuring unit (15).

Using the ventilation system (3), a convective heat flux along the surface of the sample arrangement is created. The velocity of the air stream can be varied.

In order to arrange the samples (5) as desired, the samples are clamped between two identical frames (10) and adjusted by screws. In order to test the insulation products in their actual configuration, with air spaces in between the distance between the samples can varied by moving these twinframes along blades (6) and securing them into positions with a screw based lock mechanism (11). Each of the twinframes holds just one sample. PT 100 temperature sensors are affixed to the frames to record the temperature on the sample surfaces (M4, M5, M6 and M7) as well as inside the air spaces between the samples.

R2 is equipped with neither heaters nor cooling elements. The temperature change caused by the heat flux through the sample arrangement (resulting from the temperature differences between the two chambers) is measured in R2. As may applied to the study of building constructions, chamber R2 could be used to simulate a room directly connected to an exterior wall. In this case, R1 would be at ambient temperature. A PT 100 temperature sensor is located at M9 and is used to measure the air temperature in R2. Furthermore, an infrared sensor located at M10 is used measure the surface temperature at the back of the sample arrangement as well as the heat emission from the back side of the sample arrangement.

The back of the sample arrangement can be separated thermally from chamber R2 using a diaphragm (9). The diaphragm is made of aluminum and can be removed from the measuring unit through an opening (14) in the cover of the measuring unit (15). On the side of the diaphragm facing the sample arrangement, a second surface heater (7) is set up in order to emit conductive heat onto the samples, creating a reverse heat flux through the samples in the direction of chamber R1. The surface temperature of this second heater is measured by a PT 100 temperature sensor located at M8. The heat emission provided by this heater is determined using its surface temperature. Furthermore, the temperature measurement is used to control the amount electrical current applied to the heater from an external power supply in order to provide a constant heat flux from the heater surface. The human body emits heat through the skin at a rate corresponding to the degree of physical exertion involved in a given activity. This surface heater simulates such a heat emission.

The chamber walls are made of plastic sheets in order to provide mechanical stability. The inside of the chamber walls is coated with aluminum sheets to avoid heat absorption. The outside of the chamber walls is covered with an insulation shell (8) to minimize heat transfers through the chamber walls into the environment. In this way, undesired heat losses during the measuring process can be avoided.

Figure 2:
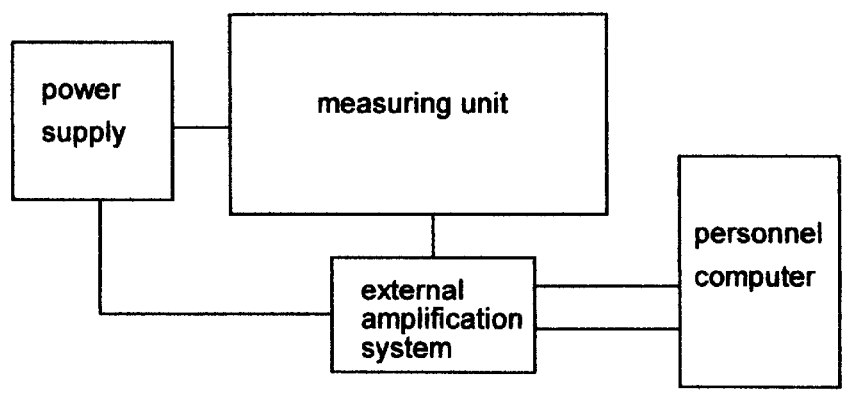
FIG. 2 is a diagram of the basic setup of the device.
Figure 3:
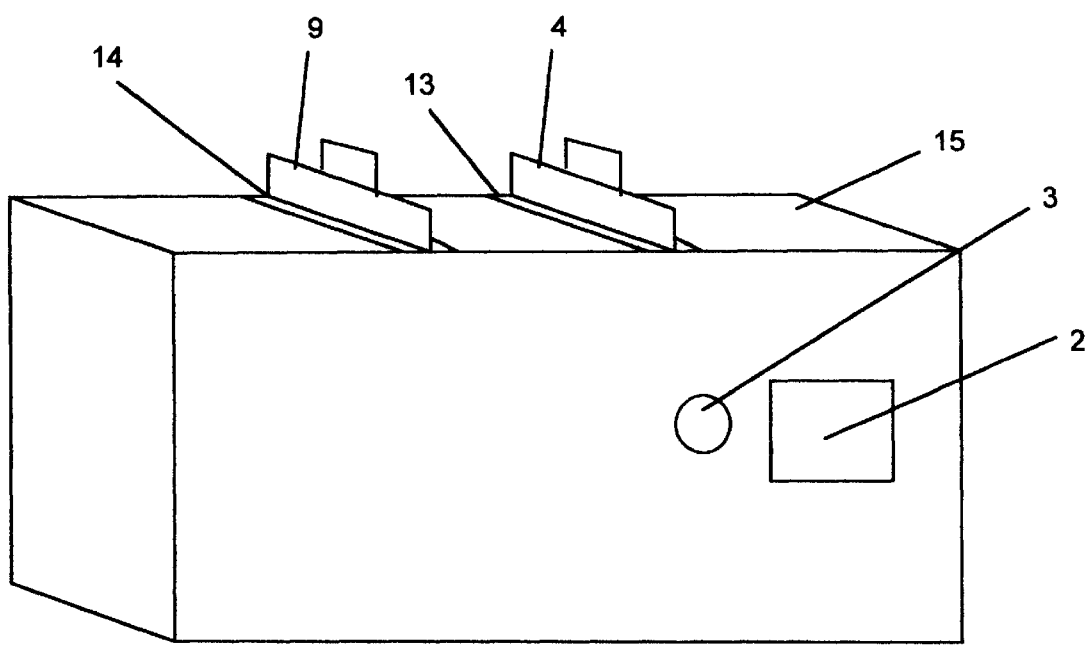
FIG. 3 is an isometric view of the measuring unit.

The measuring unit is connected to an external amplification system as well as a personnel computer as shown in FIG. 2. Using a special developed software the temperature variations in the first chamber, for instance, are realized computer controlled. Furthermore, the measuring procedures as well as the evaluation of the measuring results are automated using a new-developed computer program.

The following measurements can be carried out using the invented device:

Measurement 1: Includes the determination of the thermal protection against heat radiation. The tests are carried out on individual material samples as well as material combinations. Prior to the tests, the samples are clamped between the two frames (10), fixed with screws and staggered at their respective distances from the surface heater (1). The sample arrangement is separated from R1 and R2 by diaphragms (4) and (9). After activating the surface heater (1), its surface temperature is determined by the temperature sensor at M1 and is kept constant using the control mechanism for the electrical current applied to the heater. The irradiation intensity in front of the sample arrangement is measured with the infrared sensor at M3. When the desired irradiation intensity is reached at M3, the diaphragm (4) is removed from the device. The measurement is then initiated. The second diaphragm (9) remains in the device during the measurement. The temperature change at the back of the sample arrangement is measured at M8. This temperature measurement is used to determine the heat transfer as well as the degree of protection against heat radiation exposure provided by the material arrangement.

Measurement 2: Requires the air within R1 to either be heated or cooled to a desired temperature. After removing the diaphragms (4) and (9), the measurement is initialized. The heat transfer through the sample arrangement is determined from the temperature change in both chambers Measurement 3: As opposed to Measurement 2, this measurement is carried out during a constant heating or cooling process. The heat transfer through the sample arrangement in this procedure is determined from the temperature change in R2.

Measurement 4: Similar to Measurement 3 except a convective heat flow is provided by the ventilation system (3) which flows over the front side of the sample arrangement at a constant speed.

Measurement 5: Chamber R1 is heated and cooled repeatedly at given time intervals using the Peltier elements (2). The heat transfer through the sample arrangement is determined during the heating/cooling cycles.

Measurement 6: The samples are exposed to conductive heat provided by the surface heater (7). The temperature in R1 is kept constant. The temperature change atop the surface heater as well as inside the sample arrangement is measured.

Measurement 7: The emission coefficient of the sample arrangement is measured using the infrared sensor at M10.

Setting up and operating the device is simple. An extensive measuring program can be carried out using the invented device which makes possible the study of the heat transfer through plate-like sample arrangements as affected by various types of heat exposures. Such investigations provide an important impetus for further development of insulation products.

What is claimed:

1. A device for determination of heat transfer characteristics through an arrangement of at least one plate-like sample affected by various types of heat which consists of two chambers R1 and R2 of equal size separated by the sample arrangement and supplied with heating and cooling equipment in order to heat or cool the air in chamber R1 continuously as well as in form of cycles, surface heaters in order to provide radiant heat as well as conductive heat exposure, a ventilation system producing an air stream which flows over the front of the sample arrangement and PT 100 temperature sensors for temperature measurements as well as infrared sensors for heat radiation measurements and where the sample arrangement is separated from chamber R1 by a diaphragm to avoid heat transfer through the sample arrangement prior to the test and that this diaphragm is removed from the device through an opening in the device cover.

2. The device according to claim 1 where at least one sample is clamped between two identical frames and adjusted by screws and such a twinframe can be moved along two blades and can be secured into desired positions on the blades by means of a lock mechanism.

3. The device according to claim 1 where the sample arrangement is separated from chamber R2 by a diaphragm equipped with a surface heater on the sample side and that this diaphragm can be removed from the device through an opening in the device cover.

4. The device according to claim 1 where PT 100 temperature sensors are used to measure the surface temperature on at least one sample in order to calculate heat transfer characteristics of the sample arrangement and on the two surface heaters to control the electrical current applied to the surface heaters by an external power supply in order to provide a constant heat emission from the surface heaters and infrared sensors are used to determine radiative heat flux characteristics through the sample arrangement.

* * * * *